(12) United States Patent
Zambelli

(10) Patent No.: US 11,981,540 B2
(45) Date of Patent: May 14, 2024

(54) GRIPPING EQUIPMENT FOR LIFTING APPARATUSES AND LIFTING APPARATUS PROVIDED WITH SUCH GRIPPING EQUIPMENT

(71) Applicant: FAMATEC S.R.L., Predaia (IT)

(72) Inventor: Fabrizio Zambelli, Predaia (IT)

(73) Assignee: FAMATEC S.R.L., Predaia (IT)

( * ) Notice: Subject to any disclaimer, the term of this patent is extended or adjusted under 35 U.S.C. 154(b) by 313 days.

(21) Appl. No.: 17/349,003

(22) Filed: Jun. 16, 2021

(65) Prior Publication Data

US 2021/0395047 A1 Dec. 23, 2021

(30) Foreign Application Priority Data

Jun. 17, 2020 (IT) .................. 102020000014482

(51) Int. Cl.
*B66C 1/02* (2006.01)
(52) U.S. Cl.
CPC .......... *B66C 1/0256* (2013.01); *B66C 1/0243* (2013.01)
(58) Field of Classification Search
CPC ..... B66C 23/48; B66C 23/005; B66C 1/0256; B66C 1/0243
See application file for complete search history.

(56) References Cited

U.S. PATENT DOCUMENTS

| 5,094,495 A * | 3/1992 | Littell .................. B66C 1/0212 294/86.41 |
| 5,106,255 A * | 4/1992 | Motoda .................. B66C 23/44 212/277 |
| 6,663,154 B2 * | 12/2003 | Pancheri .............. B66C 23/005 335/205 |
| 2020/0039089 A1 * | 2/2020 | Lee ...................... B25J 15/0019 |

FOREIGN PATENT DOCUMENTS

| DE | 198 42 892 | 3/2000 |
| ES | 2 364 359 | 9/2011 |
| IT | UB20 159 295 | 6/2017 |
| IT | 2016 0010 7836 | 4/2018 |
| WO | WO 2017/010320 | 1/2017 |

* cited by examiner

*Primary Examiner* — Gerald McClain
(74) *Attorney, Agent, or Firm* — Leason Ellis LLP

(57) ABSTRACT

A gripping equipment for lifting apparatuses includes a rigid supporting framework which is adapted to be fixed/attached to the lifting apparatus. The equipment has one or more manually-operated gripping members that are fixed on the rigid supporting framework and are adapted to grasp and hold a specific object to be moved. A revolving joint is interposed between the rigid supporting framework and the lifting apparatus and allows the rigid supporting framework to rotate with respect to the lifting apparatus about a substantially vertical, first rotation axis. At least one adjustment assembly is interposed between the revolving joint and the rigid supporting framework or between two rigid elements of said rigid supporting framework and allows the position/orientation of the rigid supporting framework with respect to the vertical to be manually adjusted.

16 Claims, 7 Drawing Sheets

GRIPPING EQUIPMENT FOR LIFTING APPARATUSES AND LIFTING APPARATUS PROVIDED WITH SUCH GRIPPING EQUIPMENT

CROSS-REFERENCE TO RELATED APPLICATIONS

This Patent application claims priority from Italian Patent Application No. 102020000014482 filed on Jun. 17, 2020, the entire disclosure of which is incorporated herein by reference.

TECHNICAL FIELD

The invention relates to a gripping equipment for lifting apparatuses and to a manually-operated lifting apparatus provided with said gripping equipment.

More in detail, the invention relates to a gripping apparatus for pneumatic manipulators and to a pneumatic manipulator provided with said gripping equipment, to which the following description will explicitly refer without thereby loosing in generality.

BACKGROUND ART

As it is known, pneumatic manipulators are weight-compensation lifting apparatuses that generally comprise: a supporting column firmly fixed to the ground in a generally vertical position; a movable cantilever beam, which extends more or less parallel to the ground and is butt fixed, with its head, on the top of the supporting column with the capability of freely rotating with respect to the latter about a vertical rotation axis, so as to be able to swing on a substantially horizontal plane; a movable arm, which extends in cantilever manner from the distal end of the movable cantilever beam and is butt fixed onto the distal end of the movable cantilever beam, with the capability of freely rotating with respect to the latter about two independent rotation axes, a vertical one and a horizontal one; and a gripping equipment which is fixed to the distal end of the movable arm with the capability of freely rotating around a vertical rotation axis and is structured so as to selectively grasp and firmly hold a specific object.

More in detail, the gripping equipment is firmly fixed to the distal end of the movable arm of the manipulator, so as to remain suspended beneath the distal end of the movable arm.

Finally, the pneumatic manipulator is moreover provided with an electro-pneumatic weight-balancing device, which is capable of varying, on command, the tilt of the movable arm with respect to the vertical, and of continuously compensating the weight of the movable arm, of the gripping equipment and of the object held by the gripping equipment, so that operators can lift and freely move the object in the space with a minimum physical effort, while manually applying a light push to the gripping equipment or directly to the object integral thereto.

The gripping equipment, in turn, consists of a rigid supporting framework, which is made up of a series of straight metal bars butt welded to one another and hangs under the distal end of the movable arm through the interposition of a swivel joint that allows the framework to freely rotate about a vertical reference axis; and of a series of manually-operated gripping members that are fixed in specific points of the rigid framework.

Clearly, the structure of the gripping equipment changes based on the type of object to the grasped, with all constructive problems that this entails.

In fact, the space orientation and the centre of gravity of the gripping equipment on full-load conditions must be chosen so as to allow the manipulator to operate in an ideal manner.

As a consequence, the swivel joint is firmly fixed to the upper end of the vertical bar or of one of the vertical bars forming the rigid framework, with the interposition of an adjustment mechanism that allows operators to adjust, in the area of the swivel joint, the verticality of the rigid supporting framework and the centring thereof with respect to the rotation axis of the joint.

Unfortunately, currently known adjustment mechanisms are relatively complicated and have a limited mechanical twisting resistance, so that they are capable of only compensating for small misalignments.

DISCLOSURE OF INVENTION

Aim of the present invention is to provide an adjustment mechanism that, with equal dimensions, is more sturdy than currently known adjustment mechanisms and, furthermore, is simpler and more economic to be manufactured.

In accordance with these aims, according to the present invention there is provided a gripping equipment for lifting apparatuses as specified in claim 1 and preferably, though not necessarily, in any one of the claims depending on it.

In addition, according to the invention there is also provided a lifting apparatus as specified in claim 14 and preferably, though not necessarily, in any one of the claims depending on it.

BRIEF DESCRIPTION OF THE DRAWINGS

The invention will now be described with reference to the accompanying drawings showing a non-limiting embodiment thereof, wherein:

FIG. 6 is a side view of the lower part of the gripping equipment shown in FIGS. 2 and 5, sectioned along the midplane of the gripping equipment and with parts removed for clarity's sake; whereas

BEST MODE FOR CARRYING OUT THE INVENTION

Figure 1:
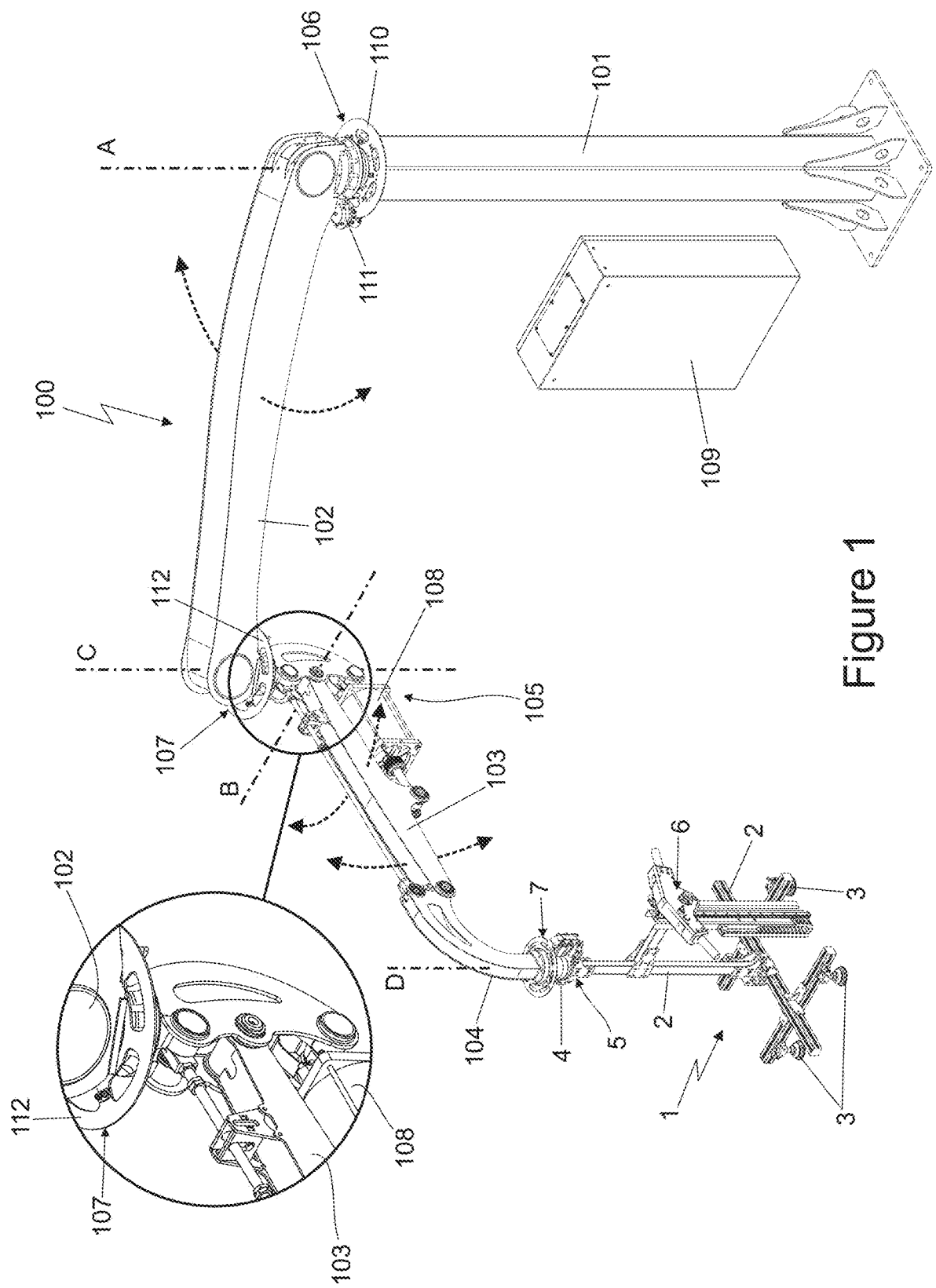
FIG. 1 is a perspective view of a lifting apparatus provided with a gripping equipment realized according to the teachings of the present invention, with parts removed for clarity's sake.
Figure 2:
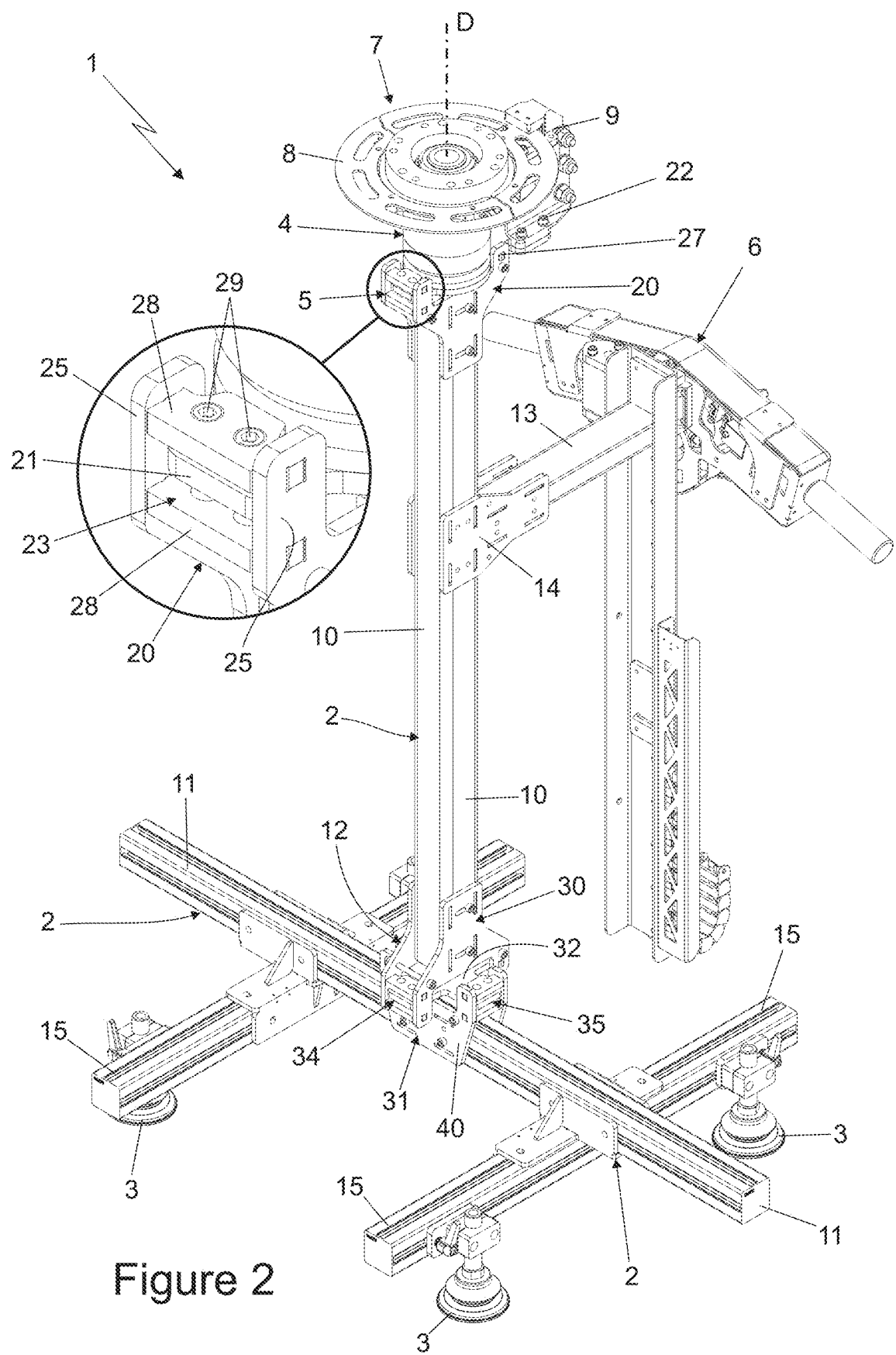
FIG. 2 is a perspective view of the gripping equipment shown in FIG. 1, with parts removed for clarity's sake.

With reference to FIGS. 1 and 2, number 1 denotes, as a whole, a gripping equipment which is structured so as to selectively grasp and firmly hold a specific object generally a great weight, and which is particularly adapted to be mounted on a apparatus for the lifting and assisted-movement of pieces, preferably of the weight-compensation type.

In other words, the gripping equipment 1 is particularly adapted to be mounted on a manually-operated lifting apparatus 100, which is capable of continuously compensating/balancing the weight of the gripping equipment 1 of the object that is momentarily integral to it, so as to allow a person to lift and freely move said object in the space with a minimum physical effort, preferably manually applying a light push directly to the gripping equipment 1 or to the object.

Preferably, the lifting apparatus 100 is furthermore a pneumatic manipulator or the like.

With reference to FIG. 1, in particular the lifting apparatus 100 preferably comprises: a supporting column 101, which is firmly fixed to the ground or to another fixed or movable support, preferably in a substantially vertical position; a movable cantilever beam 102, which extends more or less parallel to the ground and is butt fixed on the top of the supporting column 101 with the capability of freely rotating with respect to the latter about a preferably substantially vertical, rotation axis A, so as to be able to swing on a preferably substantially horizontal plane; and a movable arm 103 which extends cantilevered from the distal end of the movable beam 102 and is butt fixed to the distal end of the movable beam 102, with the capability of freely rotating with respect to the latter about a rotation axis B preferably substantially horizontal and/or substantially orthogonal to the axis A, so as be able to swing on a preferably substantially vertical plane.

Preferably, the movable arm 103 is moreover fixed to the distal end of the movable cantilever beam 102 also with the capability of freely rotating with respect to the latter about a second rotation axis C preferably substantially vertical and/or anyway locally substantially perpendicular to axis B, so as to be able to also swing on a second, preferably substantially horizontal, plane.

The gripping equipment 1 preferably is firmly fixed/coupled to the distal end of the movable arm 103 so as to be directly supported by the movable arm 103, or rather so as to hang beneath the distal end of the movable arm 103.

Preferably, the gripping equipment 1 is furthermore fixed to the distal end of the movable arm 103 in a rigid, though easily removable manner.

More in detail, with reference to FIG. 1, the movable arm 103 preferably has an articulated parallelogram geometry, and is preferably provided, at the distal end, with a curved terminal 104 that extends downwards and is adapted to directly support the gripping equipment 1.

Hence, the gripping equipment 1 is fixed firmly and in removable manner to the curved terminal 104.

With reference to FIG. 1, the lifting apparatus 100, or rather the pneumatic manipulator, additionally comprises also a weight-balancing device 105, which is capable of continuously compensating the weight of the movable arm 103, of the gripping equipment 1 and of the object momentarily integral to it, preferably so as to allow a person to manually move in the space, with a minimum/negligible physical effort, the object momentarily integral to the gripping equipment 1.

More in detail, the weight-balancing device 105 is preferably adapted to vary, on command, the tilt of the movable arm 103 with respect to the vertical, and to continuously compensate for the weight of the movable arm 103, of the gripping equipment 1 and of the object momentarily integral to it, so that any possible further movement in the space of the gripping equipment 1 and/or of the object momentarily integral thereto can be carried out manually by the operator with a minimum physical effort, preferably directly acting on the gripping equipment 1 and/or on the object momentarily integral to it.

Preferably, the lifting apparatus 100, or rather the pneumatic manipulator, is moreover also provided with a first blocking device 106 that, on command, is capable of blocking/preventing rotation of the movable beam 102 on the top of supporting column 101 about rotation axis A; and/or with a second blocking device 107 that, on command, is capable of blocking/preventing rotation of the movable arm 103 on the distal end of movable beam 102 about axis C.

In addition, the weight-balancing device 105 preferably is electro-pneumatically-operated.

With reference to FIG. 1, in particular, the weight-balancing device 105 preferably comprises: at least one single-acting or double-acting pneumatic cylinder 108, which is interposed between the movable arm 103 and the distal end of the movable beam 102, and is adapted to vary in real time the tilt of the movable arm 103 with respect to the vertical; and an electro-pneumatic air-supplying assembly 109 which is adapted to adjust the flow of pressurized air to and from the pneumatic cylinder 108, so as to control the tilt of the movable arm 103 with respect to the vertical and to continuously compensate the weight of the gripping equipment 1 and of its load, i.e. the object momentarily integral therewith.

More in detail, the electro-pneumatic assembly 109 is capable of adjusting the flow of pressurized air to and from the pneumatic cylinder 108 preferably so as to be able in sequence: to lower the movable arm 103 so as to bring the gripping equipment 1 very close to or in contact with the object to be picked up and moved; to optionally rise the movable arm 103 so as to bring the gripping equipment 1 and its load, i.e. the object to be moved integral therewith, to a predetermined height from the ground; and then to compensate the weight of the gripping equipment 1 and of its load, i.e. of the object to be moved, so that the further movements in space of the gripping equipment 1 and of its load can be carried out manually by the operator, directly acting on the gripping equipment 1 with a minimum physical effort.

Similarly to the weight-balancing device 105, also the blocking devices 106 and/or 107 are preferably electro-pneumatically-operated, and are optionally supplied by the same pressurized-air source that supplies also the electro-pneumatic air-supplying assembly 109 of the weight-balancing device 105.

More in detail, the blocking device 106 preferably is an electro-pneumatically-operated disc-caliper braking assembly.

In other words, the blocking device 106 preferably comprises: a disc 110 of metal material, which is rigidly fixed on the top of supporting column 101, substantially coaxial to axis A; a pneumatically-operated caliper 111 which is integral to the movable beam 102, is fitted on the disc 110 in sliding manner, and is finally adapted to clamp, on command, the body of disc 110 so as to prevent any movement between the two elements; and a preferably electrically-operated, control valve (not shown in the figures) which is adapted to control/adjust the flow of pressurized air to the caliper 111.

Similarly, the blocking device 107 is preferably an electro-pneumatically-operated disc-caliper braking assembly.

In other words, the blocking device 107 preferably comprises: a disc 112 of metal material, which is rigidly fixed to the distal end of movable beam 102, substantially coaxial to the axis C; a pneumatically-operated caliper (not shown in the figures), which is integral to the movable arm 103, is fitted on the disc 112 in sliding manner, and is finally adapted to clamp, on command, the body of disc 112 so as to prevent any movement between the two elements; and a preferably electrically-operated, control valve (not shown in the figures) which is adapted to control/adjust the flow of pressurized air to the caliper.

With reference to FIGS. 1 and 2, the gripping equipment 1 on the other hand comprises: a rigid supporting framework 2 adapted to be fixed/attached to the lifting apparatus 100 so as to remain suspended under the latter; and one or more manually-operated gripping members 3 that are firmly fixed to the rigid supporting framework 2 and are adapted to selectively grasp and firmly hold the object to be moved.

Clearly, the structure of gripping equipment 1 changes based on the type of object to the grasped.

In other words, the shape/structure of the rigid supporting framework 2 and the type and position of the gripping member or members 3 to be used change depending on the type of object to be grasped.

In addition, the gripping equipment 1 also comprises: a revolving joint 4, which is interposed between the rigid framework 2 and the lifting apparatus 100 and allows the rigid framework 2 to freely rotate with respect to the lifting apparatus 100 about a substantially vertical rotation axis D; and a mechanical adjustment system that allows to manually adjust the position/orientation of the rigid framework 2 with respect to the vertical.

More in detail, the gripping equipment 1 is provided with an adjustment assembly 5, which is interposed between the revolving joint 4 and the rigid framework 2, and which allows to manually adjust/regulate the position/orientation, or rather the tilt and/or misalignment, of the rigid framework 2 with respect to the rotation axis D of revolving joint 4, i.e. with respect to the vertical.

With reference to FIGS. 1 and 2, in particular, the revolving joint 4 is preferably adapted to be fixed/attached to the distal end of the movable arm 103, or rather to the curved terminal 104, so that the rigid supporting framework 2 remains suspended underneath the movable arm 103.

Preferably, the revolving joint 4 is moreover adapted to be fixed to the distal end of the movable arm 103 in a rigid, though easily removable manner.

In addition, the gripping equipment 1 preferably also comprises a manually-operated control unit 6 and/or a blocking device 7.

The blocking device 7 is preferably located at the revolving joint 4 and is capable of blocking/preventing, on command, the rotation of the rigid supporting framework 2 about axis D.

Similarly to the blocking devices 106 and/or 107, also the blocking device 7 is preferably electro-pneumatically operated and is optionally supplied by the same pressurized-air source that also supplies the electro-pneumatic air supplying assembly 109 of the weight-balancing device 105 and/or the blocking devices 106 and/or 107.

Figure 3:
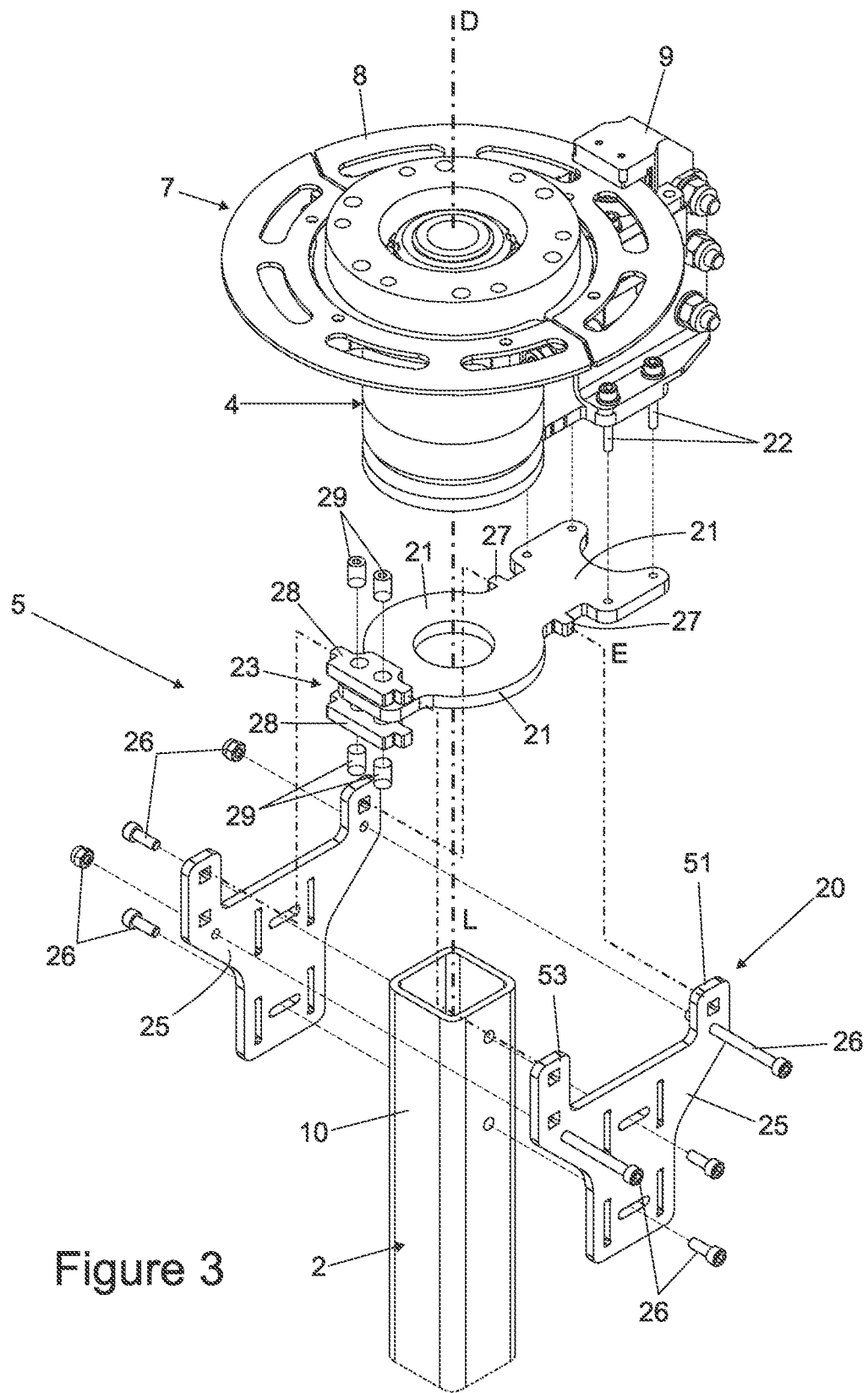
FIG. 3 is a partially exploded, perspective view of the upper part of the gripping equipment shown in FIG. 2, with parts removed for clarity's sake.

More in detail, with particular reference to FIGS. 2 and 3, the revolving joint 4 is preferably divided into an upper revolving section and a lower revolving section, which are firmly coupled to one another so as to freely rotate to one another about the axis D.

The upper revolving section is adapted to be firmly fixed to the distal end of the movable arm 103. The lower revolving section, on the other hand, is adapted to be firmly fixed to the rigid framework 2 via the interposition of the adjustment assembly 5.

Preferably, the blocking device 7 of gripping equipment 1, on the other hand, is an electro-pneumatically-operated disc-caliper braking assembly.

More in detail, the blocking device 7 preferably comprises: a disc 8 of metal material, which is rigidly fixed to the upper revolving section of revolving joint 4, so as to be substantially coaxial to the joint rotation axis D and integral to the distal end of the movable arm 103; a pneumatically-operated caliper 9, which is integral to the lower revolving section of revolving joint 4, is fitted on the disc 8 in slidable manner, and is finally adapted to clamp, on command, the body of disc 8 so as to prevent any movement between the two revolving sections of revolving joint 4; and a preferably electrically-operated, control valve (not shown in the figures) which is adapted to control/adjust the flow of pressurized air to the caliper 9.

The control unit 6 of gripping equipment 1, on the other hand, is preferably fixed/attached to the rigid framework 2 in a position where it can be easily reached by the operator and is adapted to control the gripping member or members 3 and, preferably, also the blocking device 7.

More in detail, the control unit 6 is preferably adapted to open and close, on command, the control valve of the blocking device 7.

Preferably, the control unit 6 of gripping equipment 1 is moreover adapted to also control the electro-pneumatic air-supplying assembly 109 of the weight-balancing device 105 and/or the blocking devices 106 and/or 107.

In other words, the control unit 6 is preferably adapted to open and close, on command, the control valves of the blocking devices 106 and/or 107.

With reference to FIGS. 1, 2 and 3, in turn, the rigid supporting framework 2 of gripping equipment 1 preferably comprises a series of metal bars preferably substantially straight and preferably with a square cross section, which are rigidly fixed to one another so as to form a rigid self-supporting structure.

One of these metal bars, in addition, is arranged in a substantially vertical position, i.e. extends approximately parallel to the axis D, and has the upper end rigidly fixed to the revolving joint 4, or rather to the lower revolving section of revolving joint 4, by means of the adjustment assembly 5.

In other words, the rigid supporting framework 2 of gripping equipment 1 includes an upright preferably substantially straight and preferably having a square cross section, and the revolving joint 4 is firmly fixed to the upper end of said vertical upright through the interposition of the adjustment assembly 5.

Preferably, the rigid supporting framework 2 furthermore includes also a rigid transversal beam, which is fixed in a substantially horizontal position underneath the vertical upright, and the gripping member or members 3 is (are) preferably hung/fixed beneath said rigid transversal beam.

Preferably, the longitudinal axis L of the vertical upright of rigid framework 2 moreover is slightly misaligned with respect to the rotation axis D of revolving joint 4.

In the example shown, in particular, the rigid supporting framework 2 preferably comprises: a first straight section bar 10, preferably with a tubular structure and preferably with a square cross section, which is arranged in a substantially vertical position, underneath the revolving joint 4, preferably so as to be locally substantially coaxial or anyway parallel to axis D, and has the upper end rigidly fixed to the revolving joint 4, or rather to the lower revolving section of revolving joint 4 by means of the adjustment assembly 5; and a second straight section bar 11, preferably with a complex polygonal shape, which is firmly fixed to the lower end of the straight section bar 10, i.e. on the opposite side with respect to the revolving joint 4, so as to form a rigid structure having substantially the shape of an upside-down T.

In other words, the straight section bar 11 is preferably arranged transversely to the straight section bar 10, underneath the latter.

Clearly, the straight section bar 10 preferably forms the vertical upright of the rigid supporting framework 2, whereas the straight selection bar 11 preferably forms the rigid transversal beam of the rigid supporting framework 2.

Preferably, the straight section bar 11 is moreover firmly fixed to the lower end of the straight section bar 10 through the interposition of a second adjustment assembly 12 that allows to manually adjust/vary the tilt of the straight section bar 11 with respect to the longitudinal axis of straight section bar 10, i.e. with respect to the vertical.

In other words, the rigid transversal beam of rigid framework 2 is preferably firmly fixed to the lower end of the vertical upright of rigid framework 2 through the interposition of the adjustment assembly 12, which allows to adjust/vary the tilt of the rigid transversal beam with respect to the longitudinal axis L of the vertical upright and, hence, with respect to the vertical.

Thus, the adjustment assembly 5 and the adjustment assembly 12 are preferably located at the two ends of the vertical upright of rigid framework 2.

In addition, the rigid supporting framework 2 preferably also comprises: a third straight section bar 13, preferably with a tubular structure and preferably with a square cross section, which is arranged in a substantially horizontal position, beside the straight section bar 10, and is butt fixed in a rigid manner to the side of the straight section bar 10, preferably by means of a pair of plate-like connection brackets 14, so as to jut out from the straight section bar 10 orthogonally to the longitudinal axis L of the latter and/or to the lying plane of the rigid framework having substantially the shape of an upside-down T; and two further straight section bars 15, preferably with a complex polygonal cross section, which are parallel to and spaced apart from one another and are rigidly fixed beneath the transversal straight section bar 11, preferably in a substantially specular position on opposite sides of the middle of the straight section bar 11, so as to be locally substantially perpendicular to the straight section bars 10 and 11, i.e. substantially horizontal.

The gripping members 3 of gripping equipment 1 preferably are firmly fixed on the straight section bars 15, optionally in a manually adjustable manner.

More in detail, in the example shown, the gripping members 3 preferably include one or more suction cups which, on command, are capable of firmly holding glass and marble slabs or the like and which are fixed cantilevered underneath the metal straight section bars 15, preferably in a manually adjustable manner.

In other words, in the example shown the gripping equipment 1 is preferably structured so as to grasp and hold a glass or marble slab.

The control unit 6 of gripping equipment 1, on the other hand, is preferably firmly fixed to the free end of the tubular straight section bar 13.

Figure 4:
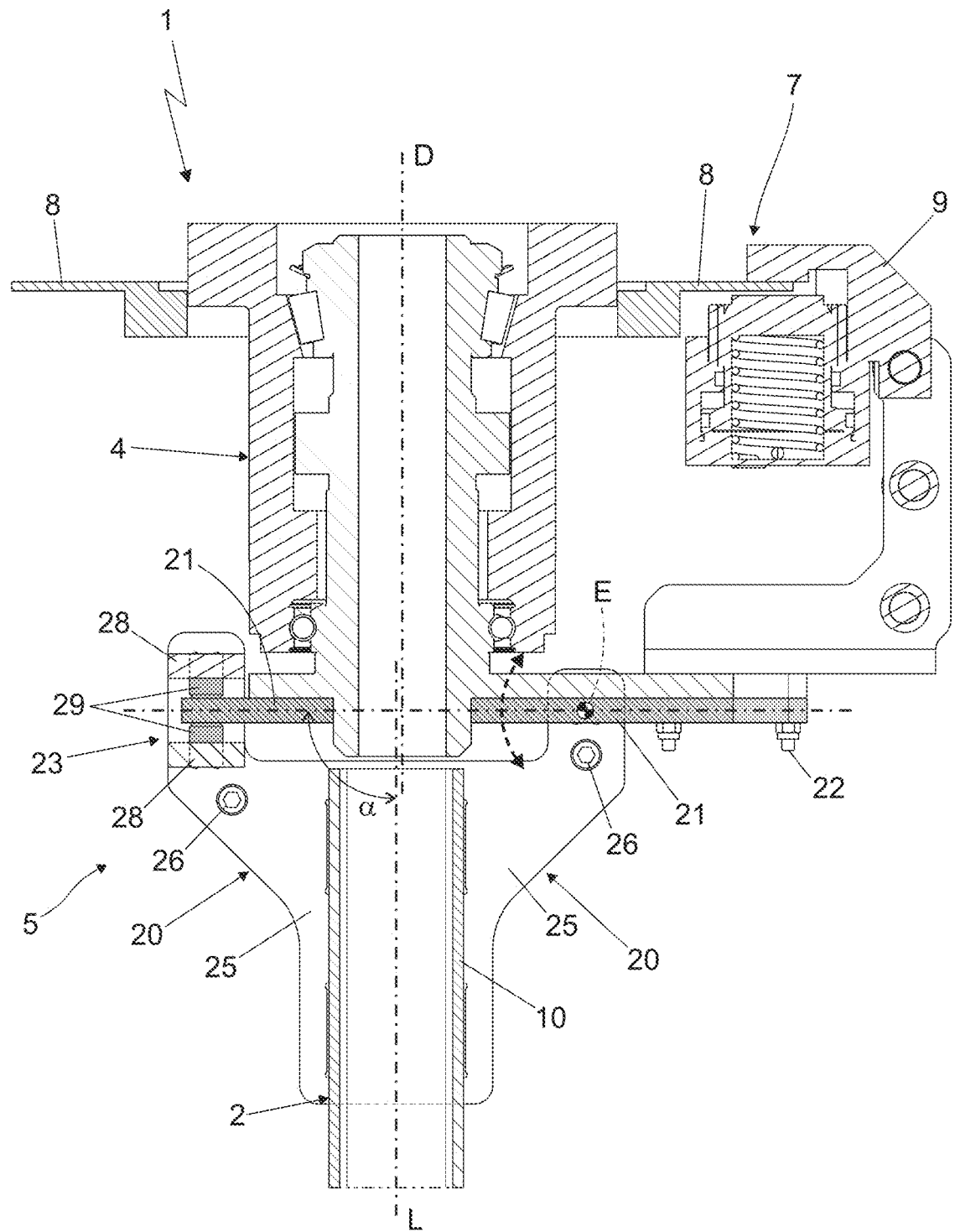
FIG. 4 is a side view of the upper part of the gripping equipment shown in FIGS. 2 and 3, sectioned along the midplane of the gripping equipment and with parts removed for clarity's sake.

With reference to FIGS. 2, 3 and 4, the adjustment assembly 5, in turn, is preferably firmly fixed to the revolving joint 4 and to the vertical upright of the rigid supporting framework 2, i.e. to the straight section bar 10, so as to intersect the rotation axis D of revolving joint 4 and/or the longitudinal axis L of the vertical upright.

The adjustment assembly 5, in addition, comprises: a rigid frame 20, which is preferably made of metal material and is firmly fixed on the upper end of the vertical upright of the rigid supporting framework 2, i.e. on the upper end of straight section bar 10, so as to face the revolving joint 4; and an oblong swinging rocker-arm 21, which is preferably made of metal material, extends transversely to the rotation axis D of revolving joint 4 and to the longitudinal axis L of the vertical upright, between the revolving joint 4 and the upper end of the vertical upright of the rigid supporting framework 2, and is pivoted on the rigid frame 20 so as to be able to freely rotate by several degrees with respect to the latter about a transversal rotation axis E that is locally substantially perpendicular to the rotation axis D and/or to the longitudinal axis L, i.e. substantially horizontal, and is moreover spaced apart from the axes D and/or L. The swinging rocker-arm 21 is furthermore rigidly fixed to the revolving joint 4, or rather to the lower revolving section of revolving joint 4, so as to be able to rotate about the rotation axis D of revolving joint 4 together with the latter.

More in detail, with particular reference to FIGS. 3 and 4, the swinging rocker-arm 21 preferably has a plate-like structure and is preferably fixed to the lower revolving section of revolving joint 4 so as to be locally substantially perpendicular to the rotation axis D of revolving joint 4.

Preferably, the swinging rocker-arm 21 is furthermore fixed in rigid manner to the lower revolving section of revolving joint 4 by means of a series of pass-through anchoring bolts 22, preferably perpendicular to the lying plane of the rocker-arm 21.

Clearly, the swinging rocker-arm 21 could also be directly welded to the lower revolving section of revolving joint 4.

With reference to FIGS. 2, 3 and 4, in addition the adjustment assembly 5 also comprises a manually-operated tilt adjusting mechanism 23, which connects the rocker-arm 21 in a rigid and manually adjustable manner to the rigid frame 20, at a predetermined distance from the transversal rotation axis E, and is capable of varying/adjusting the tilt of the rocker-arm 21 with respect to rigid frame 20.

Since the rigid frame 20 is integral to the vertical upright of rigid framework 2, or rather to the straight section bar 10, and since the rocker-arm 21 is integral to the revolving joint 4, the adjusting mechanism 23 is thus capable of varying/adjusting the tilt angle α of the oblong rocker-arm 21 with respect to the longitudinal axis L of the vertical upright of rigid framework 2, and the tilt angle of the longitudinal axis L of the vertical upright with respect to the rotation axis D of revolving joint 4, i.e. with respect to the vertical.

Preferably, the adjusting mechanism 23 and the transversal rotation axis E are moreover located on opposite sides of the rotation axis D of revolving joint 4 and/or of the longitudinal axis L of the vertical upright of rigid framework 2, both spaced apart from the axes D and/or L.

With reference to FIGS. 2, 3 and 4, in particular, the rigid frame 20 is preferably provided with a pair of forks 51, 53 that are arranged one spaced beside the other and are both arranged astride the swinging plane of the oblong rocker-arm 21, so that a first fork 51 supports the swinging rocker-arm 21 and the second fork 53 supports the adjusting mechanism 23.

More in detail, the rigid frame 20 is preferably provided with a pair of forks 51, 53 that jut out from the upper end of the vertical upright of rigid framework 2, or rather from the upper end of the straight section bar 10, on opposite sides of the upright longitudinal axis L, and are both arranged astride the swinging plane of the oblong rocker-arm 21 so as to be able to support one the swinging rocker-arm 21 and the other the adjusting mechanism 23.

Clearly, the transversal rotation axis E is perpendicular to the swinging plane of the oblong rocker arm 21.

In other words, the swinging rocker-arm 21 engages both forks of rigid frame 20 and is pivoted to one of the two forks so as to rotate about the transversal rotation axis E, whereas the adjusting mechanism 23 is supported by the second fork 53 of the rigid frame 20.

Preferably, the distance between the adjusting mechanism 23 and the axes D and/or L is moreover greater than 15 mm (millimetres). Similarly, the distance between the transversal rotation axis E and the axes D and/or L is preferably greater than 15 mm (millimetres).

With reference to FIGS. 3 and 4, in the example shown, in particular, the rigid frame 20 preferably comprises a pair of plate-like brackets 25, preferably made of metal material and preferably substantially Y-shaped, which are perpendicular to the transversal rotation axis E and are rigidly fixed to the upper end of the vertical upright of rigid framework 2, or rather to the upper end of the straight section bar 10, on opposite sides of the vertical upright, preferably by means of a series of transversal pass-through anchoring bolts 26, so as to form the two opposing forks of the rigid frame 20.

Clearly, the two plate-like brackets 25 can be rigidly fixed to the upper end of the vertical upright of rigid framework 2, or rather to the upper end of the straight section bar 10, also by welding.

Preferably, each plate-like bracket 25 is moreover made in one piece, by cutting the shape/outline of the bracket on a metal plate with a suitable thickness, preferably with the aid of a laser cutting machine of known type.

With particular reference to FIG. 3, in the example shown, furthermore, the transversal pins 27 connecting the swinging rocker-arm 21 in axially rotatable manner to the rigid frame 20, or rather to the first fork 51 of rigid frame 20, jut out cantilevered from the sides of the swinging rocker-arm 21 and are preferably made in one piece with the swinging rocker-arm 21.

More in detail, the swinging rocker-arm 21 and the two pins 27 connecting to the fork of rigid frame 20 are preferably made in one piece, by cutting the overall shape of the three components on a metal plate with a suitable thickness, preferably with the aid of a laser cutting machine of known type.

With reference to FIGS. 3 and 4, on the other hand the adjusting mechanism 23 preferably comprises: two small rigid crossbars 28 preferably made of metal material, which are fixed in rigid manner to the rigid frame 20 and extend one beside the other respectively above and beneath the swinging rocker-arm 21, preferably while remaining parallel to the transversal rotation axis E; and at least one pair of opposing threaded stems or pins 29, preferably made of metal material, which are screwed in a pass-through and manually adjustable manner, each into a respective rigid crossbar 28, so as to jut out from the corresponding rigid crossbar 28 and place its distal end in abutment against the swinging rocker-arm 21, on opposite sides of the same rocker-arm.

Preferably, the two threaded stems 29 of the or of each pair are furthermore substantially coaxial to one another and/or locally substantially perpendicular to the rocker-arm 21.

In the example shown, in particular, the adjusting mechanism 23 is preferably provided with two pairs of opposing threaded stems or pins 29, which are preferably arranged in a substantially specular position on opposite sides of the midplane of the swinging rocker-arm 21.

Since they are arranged on opposite sides of the swinging rocker-arm 21, the threaded stems 29 of the or of each pair of threaded stems are adapted to clamp the swinging rocker-arm 21 so as to immobilize the swinging rocker-arm 21 inside the rigid frame 20.

Therefore, by varying the position of the two threaded stems 29 in a coordinated manner on the corresponding rigid crossbars 28 it is possible to adjust/change the tilt of the swinging rocker-arm 21 with respect to the rigid frame 20.

With reference to FIGS. 2, 3 and 4, preferably the two rigid crossbars 28 furthermore extend like a bridge between the two arms of the second fork of the rigid frame 20, and the two ends of each rigid crossbar 28 are preferably locked inside appropriate seats made in the two arms of the fork.

Clearly, the two rigid crossbars 28 can also be rigidly fixed to the rigid frame 20, or rather to the two arms of the second fork of rigid frame 20, by means of welding.

Preferably, the two rigid crossbars 28 furthermore have a plate-like structure.

More in detail, each rigid crossbar 28 is preferably made in one single piece, by cutting the shape/outline of the crossbar on a metal plate with a suitable thickness, preferably with the aid of a laser cutting machine of known type.

Figure 5:
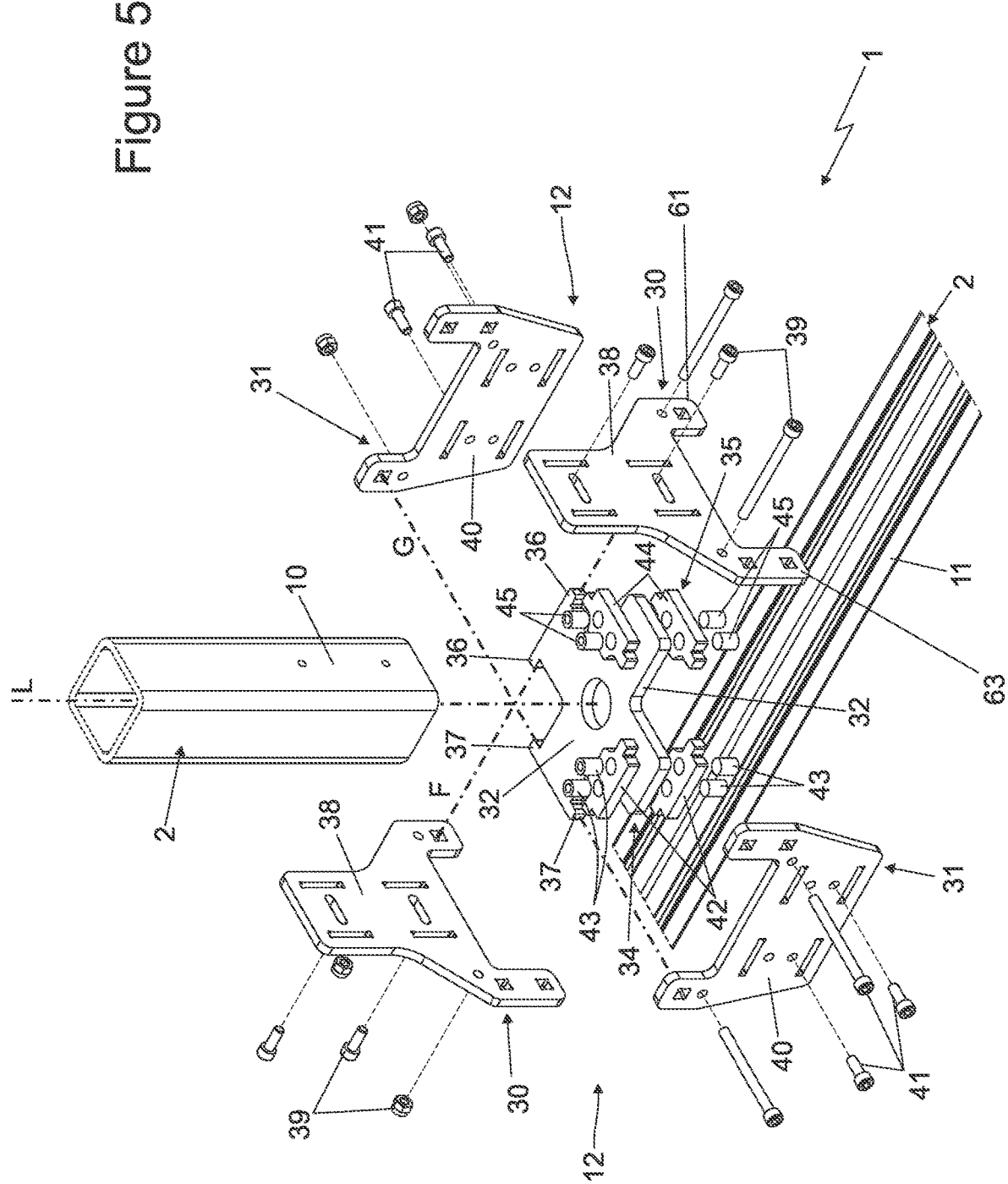
FIG. 5 is a partially exploded, perspective view of the lower part of the gripping equipment shown in FIG. 2, with parts removed for clarity's sake.
Figure 6:
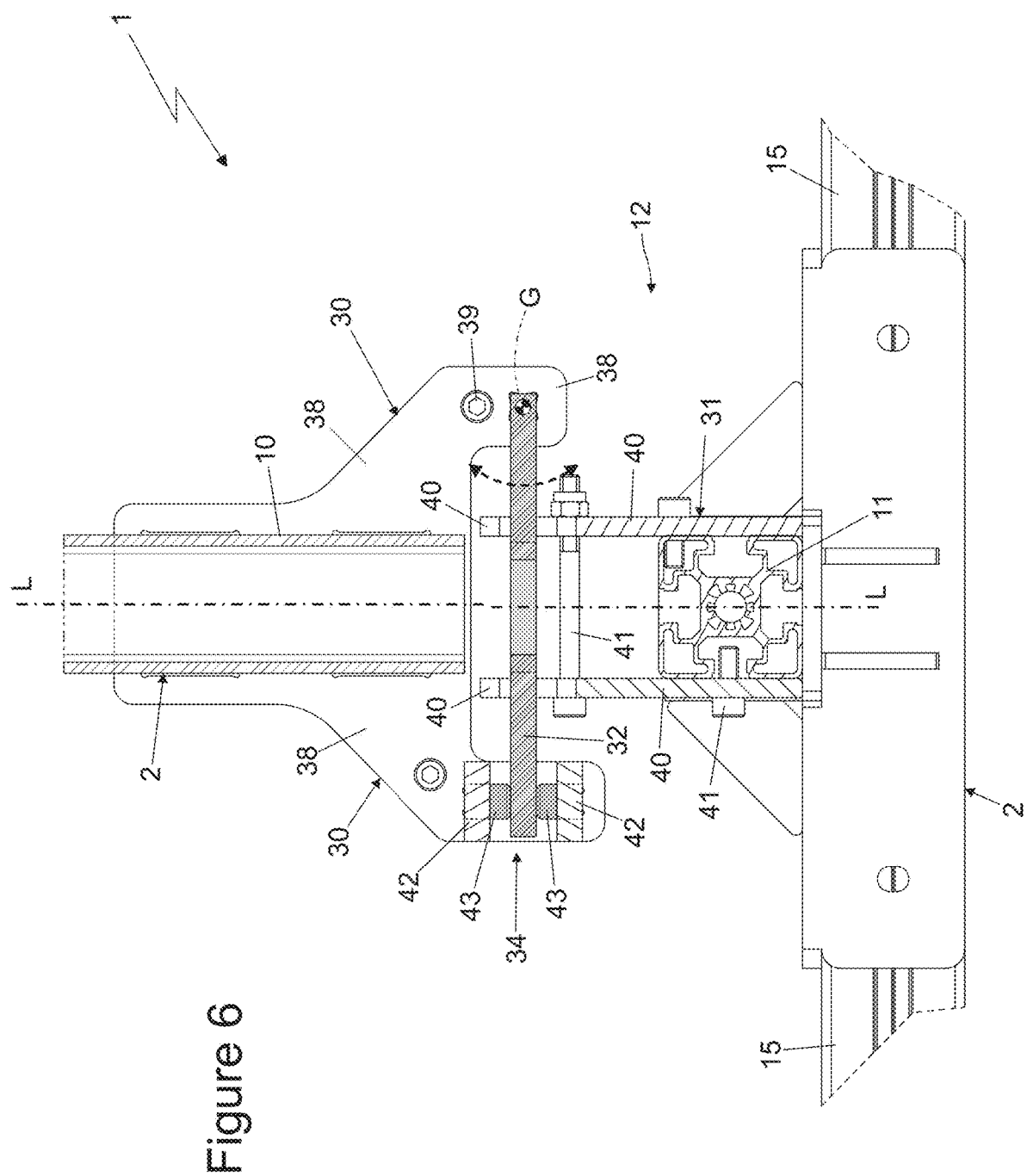

With reference to FIGS. 2, 5 and 6, the adjustment assembly 12, on the other hand, is preferably firmly fixed between the vertical upright of rigid framework 2, i.e. the straight section bar 10, and the rigid transversal beam 2, i.e. the straight section bar 11, so as to intersect the longitudinal axis L of the vertical upright.

The adjustment assembly 12, in addition, comprises: a first rigid frame 30, which is preferably made of metal material and is firmly fixed to the lower end of the vertical upright of rigid framework 2, i.e. on the lower end of straight section bar 10, so as to face the straight section bar 11; a second rigid frame 31, which is preferably made of metal material and is firmly fixed to the rigid transversal beam, i.e. to the straight section bar 11, so as to face the rigid frame 30; and an oblong swinging rocker-arm 32, which is preferably made of metal material, extends transversely to the longitudinal axis L of the vertical upright between the two rigid frames 30 and 31, and is pivoted to the rigid frame 30 so as to be able to freely rotate by several degrees with respect to the latter about a first transversal rotation axis F that is locally substantially orthogonal to and spaced apart from the longitudinal axis L of the vertical upright, i.e. substantially horizontal.

In addition, the swinging rocker-arm 32 is also pivoted on the rigid frame 31 so as to be able to freely rotate by several degrees with respect to the latter about a second transversal rotation axis G that is substantially perpendicular to the transversal rotation axis F and is locally substantially orthogonal to and spaced apart from the longitudinal axis L of the vertical upright, i.e. substantially horizontal.

In other words, the axes G and F are substantially horizontal and orthogonal to one another.

With reference to FIGS. 2, 5 and 6, the adjustment assembly 12 additionally comprises: a manually-operated first tilt-adjusting mechanism 34 that connects the swinging rocker-arm 32 in a rigid and manually adjustable manner to the rigid frame 30, at a predetermined distance from the transversal rotation axis F, so as to be able to manually vary/adjust the tilt of the rocker-arm 32 with respect to the rigid frame 30; and a manually-operated second tilt adjusting mechanism 35 that connects the swinging rocker-arm 32 in a rigid and manually adjustable manner to the rigid frame 31, at a predetermined distance from the transversal rotation axis G, so as to be able to manually vary/adjust the tilt of the rocker-arm 32 with respect to the rigid frame 31.

Preferably, the adjusting mechanism 34 and the transversal rotation axis F are furthermore located on opposite sides of the longitudinal axis L of the vertical upright of rigid framework 2, both spaced apart from the same longitudinal axis L.

Similarly, the adjusting mechanism 35 and the transversal rotation axis G are preferably located on opposite sides of the longitudinal axis L of the vertical upright of rigid framework 2, both spaced apart from the same longitudinal axis L.

Therefore, the adjustment assembly 12 differs from the adjustment assembly 5 in that the swinging rocker-arm 32, instead of being directly fixed in rigid manner to the lower revolving section of the revolving joint 4, is pivoted on a further rigid frame, i.e. on rigid frame 31, so as to be able to freely rotate by several degrees with respect to the latter about a second transversal rotation axis, i.e. the axis G, which is perpendicular to the first transversal rotation axis, i.e. the axis F. Said further rigid frame, in turn, is rigidly fixed/attached to the rigid framework 2.

Since the rigid frame 30 is integral to the vertical upright of rigid framework 2, or rather to the straight section bar 10, and since the rigid frame 31 is integral to the rigid transversal beam of rigid framework 2, or rather to the straight section bar 11, the adjusting mechanisms 34 and 35 are capable of varying/adjusting the tilt angle of the rigid transversal beam with respect to the longitudinal axis L of the vertical upright of rigid framework 2 and, hence, with respect to the vertical, with reference to two Cartesian planes orthogonal to one another.

Therefore, the adjustment assembly 12 is capable of varying/adjusting the roll and/or pitch angles of the rigid transversal beam of rigid framework 2 and of the object integral therewith.

More in detail, with reference to FIGS. 2, 5 and 6, the rigid frame 30 is preferably provided with a pair of forks 61, 63 that jut out from the lower end of the vertical upright of frigid framework 2, or rather from the lower end of straight section bar 10, on opposite sides of the longitudinal axis L of the upright, and are both arranged astride a first swinging plane of the oblong rocker-arm 32 so as to support one the swinging rocker-arm 32 and the other the adjusting mechanism 34.

Clearly the transversal rotation axis F is perpendicular to said first swinging plane of the oblong rocker arm 32.

In other words, the swinging rocker-arm 32 engages both forks 61, 63 of rigid frame 30 and is pivoted on one of the two forks so as to rotate about the transversal rotation axis F, whereas the adjusting mechanism 34 is supported by the second fork 63 of rigid frame 30.

Preferably, the distance between the adjusting mechanism 34 and the upright longitudinal axis L is furthermore greater than 15 mm (millimetres). Similarly, the distance between the transversal rotation axis F and the upright longitudinal axis L is preferably greater than 15 mm (millimetres).

Similarly, the rigid frame 31 is preferably provided with a pair of forks that are arranged one beside and spaced apart from the other, and are both arranged astride the second swinging plane of the oblong rocker-arm 32 so that a first fork 61 supports the swinging rocker-arm 32 and the second fork 63 supports the adjusting mechanism 35.

More in detail, even the rigid frame 31 is preferably provided with a pair of forks that jut out from the rigid transversal beam of frigid framework 2, or rather from the straight section bar 11, towards the lower end of the vertical upright of rigid framework 2, or rather the lower end of straight section bar 10, on opposite sides of the upright longitudinal axis L, and are both arranged astride a second swinging plane of the oblong rocker-arm 32 so as to support one the swinging rocker-arm 32 and the other the adjusting mechanism 35.

Clearly the transversal rotation axis G is perpendicular to said second swinging plane of the oblong rocker arm 32.

In other words, the swinging rocker-arm 32 engages both forks of rigid frame 31 and is pivoted on one of the two forks so as to rotate about the transversal rotation axis G, whereas the adjusting mechanism 35 is supported by the second fork of rigid frame 31.

Preferably, the distance between the adjusting mechanism 33 and the upright longitudinal axis L is furthermore greater than 15 mm (millimetres). Similarly, the distance between the transversal rotation axis G and the upright longitudinal axis L is preferably greater than 15 mm (millimetres).

With particular reference to FIGS. 5 and 6, preferably the swinging rocker-arm 32 is moreover substantially in the shape of a Greek cross, with the four arms perpendicular, in pairs, to the axes F and G. In addition, the swinging rocker-arm 32 is preferably pivoted on the rigid frames 30 and 31 at the distal ends of two different arms of the cross that are orthogonal to one another.

Similarly to the swinging rocker-arm 21, even the swinging rocker-arm 32 has a plate-like structure and is preferably arranged underneath and spaced apart from the lower end of the vertical upright of rigid framework 2 so as to be more or less perpendicular to the upright longitudinal axis L.

Preferably, the transversal pins 36 connecting the swinging rocker-arm 32 in axially rotatable manner to rigid frame 30, or rather to one of the two forks of rigid frame 30, moreover jut out cantilevered from the sides of the swinging rocker-arm 32 and are preferably made in one piece with the swinging rocker-arm 32.

Similarly, the transversal pins 37 connecting the swinging rocker-arm 32 in axially rotatable manner to rigid frame 31, or rather to one of the two forks of rigid frame 31, preferably jut out cantilevered from the sides of the swinging rocker-arm 32 and are preferably made in one piece with the swinging rocker-arm 32.

More in detail, the swinging rocker-arm 32, the two pins 36 connecting to the fork of rigid frame 30 and the two pins 37 connecting to the fork of rigid frame 31 are preferably made in one piece, by cutting the overall shape of the five components on a metal plate with a suitable thickness, preferably with the aid of a laser cutting machine of known type.

With reference to FIGS. 5 and 6, similarly to the rigid frame 20, even the rigid frame 30 preferably comprises a pair of plate-like brackets 38, preferably made of metal material and preferably substantially Y-shaped, which are perpendicular to the transversal rotation axis F and are rigidly fixed to the lower end of the vertical upright of rigid framework 2, or rather to the lower end of straight section bar 10, on opposite sides of the vertical upright, preferably by means of a series of transversal pass-through anchoring bolts 39, so as to form the two opposing forks of rigid frame 30.

Clearly the two plate-like brackets 38 can be rigidly fixed to the lower end of the vertical upright of rigid framework 2, or rather to the lower end of straight section bar 10, also by welding.

Preferably, each plate-like bracket 38 is moreover made in one piece, by cutting the shape/outline of the bracket on a metal plate with a suitable thickness, preferably with the aid of a laser cutting machine of known type.

On the other hand, the rigid frame 31 preferably comprises a pair of plate-like brackets 40 preferably made of metal material and preferably substantially U-shaped, which are perpendicular to the transversal rotation axis G, and are rigidly fixed to the body of the rigid transversal beam of rigid framework 2, or rather of straight section bar 11, on opposite sides of the beam, preferably by means of a series of transversal pass-through anchoring bolts 41, so as to form the two opposing forks of rigid frame 31.

The two plate-like brackets 40 of rigid frame 31 are therefore perpendicular to the two plate-like brackets 38 of rigid frame 30.

Clearly the two plate-like brackets 40 can be rigidly fixed to the body of the straight transversal section bar 11 also by welding.

Preferably, each plate-like bracket 40 is moreover made in one piece, by cutting the shape/outline of the bracket on a metal plate with a suitable thickness, preferably with the aid of a laser cutting machine of known type.

With reference to FIGS. 5 and 6, in turn, the adjusting mechanism 34 preferably comprises: two small rigid crossbars 42 preferably made of metal material, which are rigidly fixed to the rigid frame 30 and extend one beside the other respectively above and beneath the swinging rocker-arm 32, preferably while remaining parallel to the transversal rotation axis F; and at least one pair of opposing threaded stems or pins 43, preferably made of metal material, which are screwed in pass-through and manually adjustable manner, each into a respective rigid crossbar 42, so as to jut out from the corresponding rigid crossbar 42 and arrange its distal end in abutment against the swinging rocker-arm 32, on opposite sides of the same rocker-arm.

Preferably, the two threaded stems 43 of the or of each pair are furthermore substantially coaxial to one another and/or locally substantially perpendicular to the rocker-arm 32.

In the example shown, in particular, the adjusting mechanism 34 is preferably provided with two pairs of opposing threaded stems or pins 43 that are preferably arranged, in a substantially specular position, on opposite sides of the midplane of a corresponding arm of the cross-shaped swinging rocker-arm 32.

With reference to FIGS. 2, 5 and 6, preferably the two rigid crossbars 42 moreover extend like a bridge between the two arms of the second fork of rigid frame 30, and the two ends of each rigid crossbar 42 are preferably locked inside appropriate seats realized in the two arms of the fork.

Clearly, the two rigid crossbars 42 can also be fixed in rigid manner to rigid frame 30, or rather to the two arms of the second fork of rigid frame 30, by welding.

Preferably, the two rigid crossbars 42 moreover have a plate-like structure. More in detail, each rigid crossbar 42 is preferably made in one piece, by cutting the shape/outline of the crossbar on a metal plate with a suitable thickness, preferably with the aid of a laser cutting machine of known type.

With reference to FIGS. 2, 5 and 6, similarly, the adjusting mechanism 35 preferably comprises: two small rigid crossbars 44 preferably made of metal material, which are rigidly fixed to the rigid frame 31 and extend one beside the other respectively above and beneath the swinging rocker-arm 32, preferably while remaining parallel to the transversal rotation axis G; and at least one pair of opposing threaded stems or pins 45, preferably made of metal material, which are screwed in pass-through and manually adjustable manner, each into a respective rigid crossbar 44, so as to jut out from the corresponding rigid crossbar 42 and arrange its distal end in abutment against the swinging rocker-arm 32, on opposite sides of the same rocker-arm.

Preferably, the two threaded stems 45 of the or of each pair are furthermore substantially coaxial to one another and/or locally substantially perpendicular to the rocker-arm 32.

In the example shown, in particular, the adjusting mechanism 35 is preferably provided with two pairs of opposing threaded stems or pins 45, which are preferably arranged in a substantially specular position on opposite sides of the midplane of a corresponding arm of the cross-shaped swinging rocker-arm 32.

With reference to FIGS. 2, 5 and 6, preferably the two rigid crossbars 44 furthermore extend like a bridge between the two arms of the second fork of rigid frame 31, and the two ends of each rigid crossbar 44 are preferably locked inside appropriate seats made in the two arms of the fork.

Clearly, the two rigid crossbars 44 can also be fixed in rigid manner to rigid frame 31, or rather to the two arms of the second fork of rigid frame 31, by welding.

Preferably, the two rigid crossbars 44 furthermore have a plate-like structure. More in detail, each rigid crossbar 44 is preferably made in one piece, by cutting the shape/outline of the crossbar on a metal plate with a suitable thickness, preferably with the aid of a laser cutting machine of known type.

With reference to FIGS. 2, 5 and 6, since they are arranged on opposite sides of the swinging rocker-arm 32, the threaded stems 43 and 45 of each pair of threaded stems are adapted to clamp the swinging rocker-arm 32 so as to immobilize the swinging rocker-arm 32 inside the rigid frames 30 and 31.

Therefore, by varying the position of the threaded stems or pins 43 in a coordinated manner on the corresponding rigid crossbars 42 it is possible to adjust/vary the tilt of the swinging rocker-arm 32 with respect to the rigid frame 30, with reference to a first reference Cartesian plane. On the other hand, by varying the position of the threaded stems or pins 45 in a coordinated manner on the corresponding rigid crossbars 44 it is possible to adjust/change the tilt of the swinging rocker-arm 32 with respect to the rigid frame 31, with reference to a second reference Cartesian plane orthogonal to the first Cartesian plane.

In other words, by acting on the threaded stems or pins 43 and 45 of the adjustment assembly 12 it is possible to separately vary/adjust the roll and pitch angles of the rigid transversal beam of rigid framework 2, or rather of straight section bar 11, and of the object integral therewith.

Operation of lifting apparatus 100 and of gripping equipment 1 are easily inferable from the description above and therefore does not need further explanations.

As concerns the adjustment assembly 5 and the adjustment assembly 12, after having fixed the gripping equipment 1 to the lifting apparatus 100, or rather after having fixed the gripping equipment 1 to the distal end of the movable arm 103 of the pneumatic manipulator, the technician can manually adjust the position/orientation in space, or rather the verticality, of the rigid supporting framework 2 by screwing and unscrewing, in a coordinated manner, the threaded stems or pins 29, 43 and 45 in the corresponding rigid crossbars 28, 42 and 44.

The advantages deriving from the particular structure of the adjustment assembly 5 and of the adjustment assembly 12 are remarkable.

First of all, the adjustment assemblies 5 and 12 have a mechanical twisting resistance that is much higher than that of currently known adjustment systems, thus they are able to compensate also large misalignments.

Furthermore, given the same strength features, the adjustment assemblies 5 and 12 are significantly lighter and more compact in height than the current systems, with all advantages that this entails.

In addition, the adjustment assemblies 5 and 12 are much cheaper to be manufactured compared to currently known adjustment assemblies.

The majority of the components of the adjustment devices 5 and 12, in fact, can be manufactured on site by properly cutting, preferably by means of a common laser cutting machine, one single type of metal plate with a nominal thickness preferably ranging between 3 and 15 mm (millimetres), with the remarkable simplifications that this entails.

It is finally clear that changes and variations may be made to the gripping equipment 1 and/or the lifting apparatus 100 described above without however going beyond the scope of the present invention.

For example, instead of being fixed to the ground, the supporting column 101 can be fixed to a movable slide that is capable of moving horizontally along a track, which is preferably firmly anchored to the ceiling. In this embodiment, therefore, the supporting column 101 juts out from the movable slide downwards and the movable cantilever beam 102 is preferably butt fixed to the lower end of the supporting column 101.

In addition, in a second embodiment of lifting apparatus 100, the pneumatic cylinder 108 and the electro-pneumatic control unit 109 of the weight-balancing device 105 may be replaced by an electrically-operated linear actuator and by an electronic control unit adapted to command the linear actuator based on the signals coming from one or more load cells capable of detecting the forces acting on the hanging load.

In other words, the lifting apparatus 100 could be an electric manipulator.

As concerns the gripping equipment 1, in a first alternative embodiment the position of the adjustment devices 5 and 12 could be switched.

In other words, the adjustment assembly 12 could be located on the upper end of the vertical upright of rigid framework 2 and the adjustment assembly 5 could be located on the lower end of the vertical upright.

In a second not-shown alternative embodiment, moreover, the rigid supporting framework 2 could lack the straight section bars 15. In this case, the gripping members 3 could be located at the two ends of the rigid transversal beam of rigid framework 2, i.e. at the two ends of straight section bar 11, and could consist of two magnetic holding assemblies for metal plated, preferably, though not necessarily, like the ones disclosed in U.S. Pat. No. 6,663,154.

Figure 7:
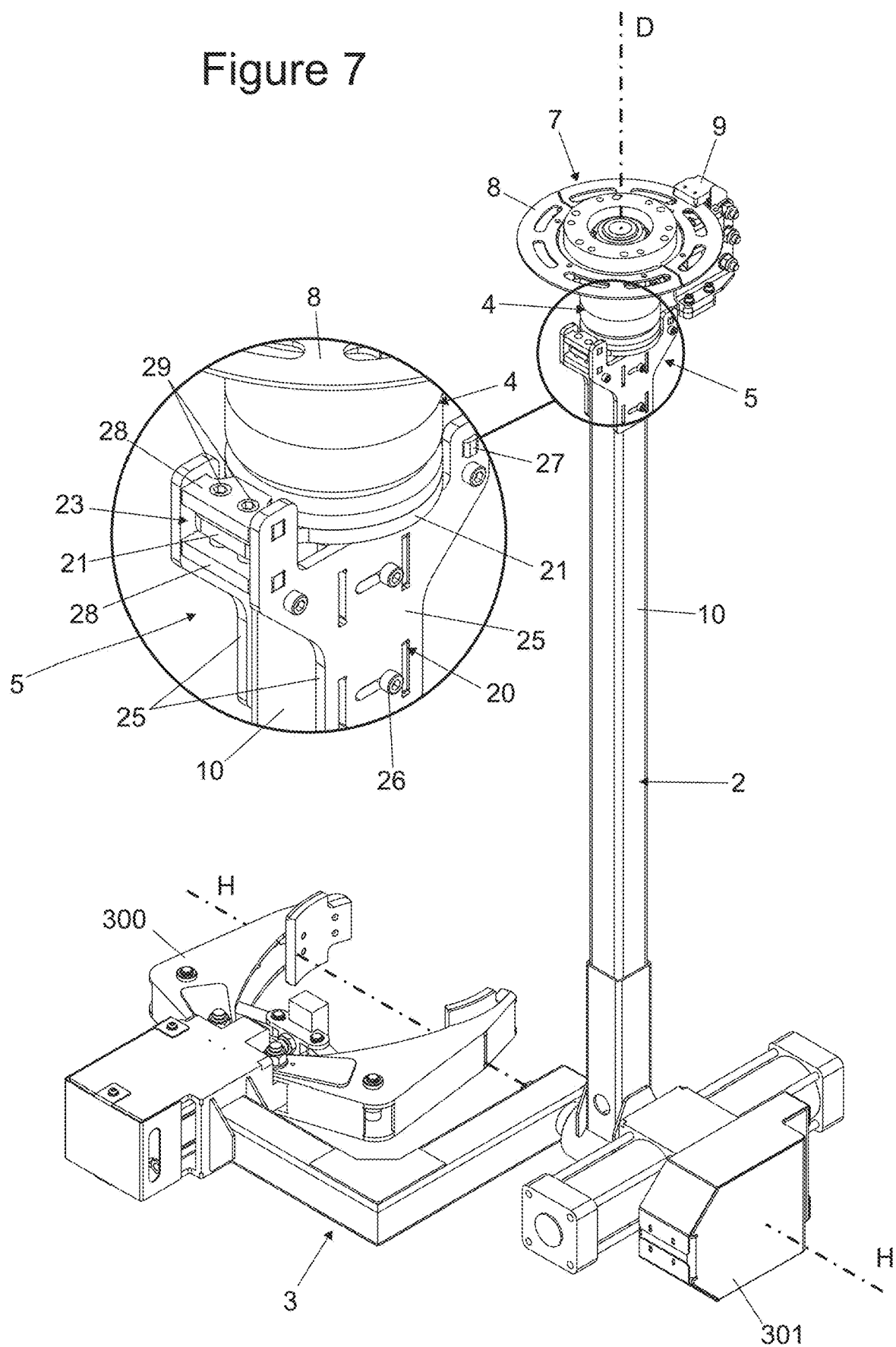
FIG. 7 is a perspective view of a variant of the gripping equipment shown in the preceding figures.

With reference to FIG. 7, in a third embodiment, the gripping member 3 of gripping equipment 1 is preferably directly fixed to the lower end of the vertical upright of rigid framework 2, i.e. of the straight section bar 10.

In this embodiment, therefore, the rigid supporting framework 2 comprises the sole vertical upright, i.e. the sole straight section bar 10.

Preferably, the gripping member 3 furthermore comprises: a pneumatically-operated clamping assembly 300, which is fixed cantilevered to the lower end of the vertical upright of rigid framework 2, i.e. of the straight section bar 10, beside the vertical upright, with the capability of freely rotating about a rotation axis H which is preferably locally substantially perpendicular to the longitudinal axis L of the vertical upright and, hence, substantially perpendicular to axis D; and preferably also a preferably electro-pneumatically-operated rotating actuator 301 which is capable of rotating, on command, the clamping assembly 300 about the axis H.

Alternatively, the gripping member 3 could also be a large lifting hook firmly fixed to the lower end of the straight section bar 10, i.e. to the lower end of the vertical upright of rigid framework 2, or a magnetic holding assembly like the one described in U.S. Pat. No. 6,663,154.

The control unit 6 (not shown in this figure) is preferably fixed on the side of the straight tubular element 10 and is preferably adapted to command the clamping assembly 300 and/or the rotating actuator 301.

Clearly, even in this embodiment, the vertical upright of rigid framework 2, i.e. the straight section bar 10, is fixed/connected to the lifting apparatus 100 through the interposition of the revolving joint 4 and of the adjustment assembly 5.

In a variation, however, the adjustment assembly 5 could be replaced by the adjustment assembly 12.

In other words, the rigid supporting framework 2 could comprise the sole vertical upright and the upper end of the vertical upright could be connected to the revolving joint 4 by means of the adjustment assembly 12.

In this case, the rigid frame 31 would be rigidly fixed to the lower revolving section of the revolving joint 4.

The invention claimed is:

1. A gripping equipment for lifting apparatuses comprising: a rigid supporting framework which is adapted to be fixed and/or attached to the lifting apparatus; one or more manually-operated gripping members which are fixed to said rigid supporting framework and are adapted to grasp and hold a specific object to be moved; a revolving joint which is interposed between the rigid supporting framework and the lifting apparatus, and allows said rigid supporting framework to rotate with respect to the lifting apparatus about a substantially vertical, first rotation axis; and a mechanical adjustment system that allow to adjust the position and/or orientation of said rigid supporting framework with respect to the vertical;

wherein said mechanical adjustment system comprises an adjustment assembly which is interposed between the revolving joint and the rigid supporting framework, or between two rigid elements of said rigid supporting framework, for allowing manual adjustment of the tilt and/or misalignment of the rigid framework with respect to said first rotation axis; said adjustment assembly comprising a first rigid frame fixed to a first rigid element of the rigid supporting framework; an oblong swinging rocker-arm which extends transversely to said first rotation axis is pivoted on said first rigid frame so as to be able to freely rotate about a second rotation axis locally substantially orthogonal to said first rotation axis; and at least one manually-operated first tilt adjusting mechanism that connects the swinging rocker-arm in a rigid and manually adjustable manner to said first rigid frame, at a predetermined distance from said second rotation axis, and is capable of adjusting the tilt of the swinging rocker-arm with respect to said first rigid frame while preventing any free movement of the swinging rocker-arm with respect to the first rigid frame.

2. Gripping equipment according to claim 1, wherein the first rigid frame is provided with a pair of forks that are arranged one spaced beside the other, and are both arranged astride the swinging plane of the swinging rocker-arm so that a first fork supports the swinging rocker-arm, and a second fork supports the first tilt adjusting mechanism.

3. Gripping equipment according to claim 1, wherein the first tilt adjusting mechanism comprises: two rigid crossbars that are rigidly fixed to the first rigid frame, and extend one beside the other respectively above and beneath the swinging rocker-arm; and at least one pair of opposing threaded stems or pins that are screwed in pass-through and manually adjustable manner, each in a respective rigid crossbar, so as to jut out from the corresponding rigid crossbar and arrange its distal end in abutment against the swinging rocker-arm, on opposite sides of the same swinging rocker-arm.

4. Gripping equipment according to claim 3, wherein the two rigid crossbars 124 extend between the two arms of the second fork of the first rigid frame.

5. Gripping equipment according to claim 1, wherein the swinging rocker-arm has a plate structure.

6. Gripping equipment according to claim 1, wherein the first rigid frame includes a first pair of brackets that are perpendicular to said second rotation axis, and are fixed on said first rigid element of the rigid supporting framework, on opposite sides of the same element.

7. Gripping equipment according to claim 1, wherein the swinging rocker-arm is rigidly fixed to the revolving joint, so that it can rotate about said first rotation axis together with the joint.

8. Gripping equipment according to claim 1, wherein the adjustment assembly additionally comprises a second rigid frame which is fixed to a second rigid element of the rigid supporting framework or to the revolving joint, so as to face said first rigid frame; wherein the swinging rocker-arm is pivoted also on said second rigid frame so as to be able to rotate with respect to the latter about a third rotation axis substantially perpendicular to said second rotation axis; and wherein the adjustment assembly additionally comprises a manually-operated, second tilt adjusting mechanism that connects the swinging rocker-arm in a rigid and manually adjustable manner to said second rigid frame, at a predetermined distance from said third rotation axis, and is capable of varying and/or adjusting the tilt of the swinging rocker-arm with respect to said second rigid frame.

9. Gripping equipment according to claim 8, wherein the swinging rocker-arm is substantially in the shape of a Greek cross.

10. Gripping equipment according to claim 8, wherein the second rigid frame includes a second pair of brackets that are perpendicular to said third rotation axis, and are fixed on said second rigid element of the rigid supporting framework on opposite sides of the same element.

11. Gripping equipment according to claim 1, wherein the rigid supporting framework includes a vertical upright and the revolving joint is firmly fixed on the upper end of said vertical upright with the interposition of a first adjustment assembly.

12. Gripping equipment according to claim 11, wherein the rigid supporting framework additionally includes a rigid transversal beam that is fixed in a substantially horizontal position beneath the vertical upright, and the one or more gripping members are hung and/or fixed beneath said rigid transversal beam.

13. Gripping equipment according to claim 12, wherein the rigid transversal beam is fixed to the lower end of the vertical upright by means of a second adjustment assembly.

14. A manually-operated lifting apparatus comprising: a supporting column; a movable cantilever beam which is butt fixed to the supporting column with the capability of swivelling over a substantially horizontal plane; and a movable arm which extends in cantilever manner from the distal end of the movable cantilever beam, and is butt fixed to the distal end of the movable cantilever beam with the capability of freely rotating with respect to the latter around a first substantially horizontal rotation axis, so as to swing over a second substantially vertical plane;

wherein the lifting apparatus additionally comprises a gripping equipment which is realized according to claim 1, and is fixed and/or hooked to the distal end of the movable arm so as to be directly supported by said movable arm.

15. Manually-operated lifting apparatus according to claim 14, wherein said movable arm is additionally fixed to the distal end of the movable cantilever beam with the capability of freely rotating with respect to the latter about a second substantially vertical rotation axis, so as to be able to swing also over a third substantially horizontal plane.

16. Manually-operated lifting apparatus according to claim 14, characterized by additionally comprising a weight balancing device that is adapted to continuously compensate the weight of the movable arm, of the gripping equipment and of the object momentarily attached thereto.

* * * * *